United States Patent [19]
Mattox et al.

[11] 3,877,506
[45] Apr. 15, 1975

[54] TIRE BUFFING MACHINE

[76] Inventors: John R. Mattox, Rt. 3, Box 208-A, Charlotte, N.C. 28201; Thomas W. Mattox, 7205 Morley Cir., Charlotte, N.C. 28214

[22] Filed: Apr. 8, 1974

[21] Appl. No.: 459,104

[52] U.S. Cl.......................... 157/13; 29/76
[51] Int. Cl................. B29h 21/08; B23d 67/00
[58] Field of Search............................ 157/13; 29/76

[56] References Cited
UNITED STATES PATENTS

| | | | |
|---|---|---|---|
| 2,515,167 | 7/1950 | Arel | 157/13 |
| 2,786,526 | 3/1957 | Tobey | 157/13 |
| 2,979,123 | 4/1961 | Frohlich et al. | 157/13 |
| 3,528,476 | 9/1970 | Hawkinson, Jr. | 157/13 |
| 3,584,673 | 6/1971 | Lehmann | 157/13 |
| 3,675,706 | 7/1972 | Cahil | 157/13 |

*Primary Examiner*—Harrison L. Hinson
*Attorney, Agent, or Firm*—B. P. Fishburne, Jr.

[57] ABSTRACT

A machine for buffing the tread face of a tire casing in preparation for retreading features a buffing rasp and a tire mounting shaft assembly which lies in a horizontal plane so that the rasp and tire casing revolve in vertical planes. The tire mounting assembly is supported on a floor-mounted radius adjustment carriage which is motor driven with precision control. The tire mounting assembly is pivotally supported on the radius adjustment carriage for swinging in a horizontal arc relative to the periphery of the horizontal axis rasp. The mounting assembly may also pivot in a vertical plane under control of a precision screw actuator to regulate the depth of cut by the rotary buffing rasp. An overhead counterbalanced side wall buffer attachment is provided. A standard type floor-mounted electric motor for the buffing rasp is utilized and the latter has a long shaft with widely spaced bearings on an extremely sturdy pedestal. An independently controlled kick cylinder assures easy and rapid inflation of the tire casing. A small conveniently located front console renders the machine easy to use with the operator having a clear view of vital operations.

18 Claims, 12 Drawing Figures

TIRE BUFFING MACHINE

BACKGROUND OF THE INVENTION

The prior art contains numerous teachings pertaining to buffers for pneumatic tire casings used in the preparation of the casings for a replacement treat in accordance with known retreading procedures. While a number of prior art buffing machines have reached the market and are reasonably satisfactory to use, there is still continuing and increasing need for a more efficient and convenient buffing machine to satisfy the requirements of precision buffing necessary in connection with the latest retreading techniques. It is required particularly in the operation of retreading tire casings with precured treads utilizing a cushion gum binder in a low temperature process that the face of the casing which receives the replacement tread be buffed precisely to a predetermined crown or radius within a relatively small tolerance. The present invention has for one of its principal objects to satisfy this need for precision buffing of the tread face of a tire casing to a predetermined radius, through the provision of a radium adjustment carriage with precision control and driving means.

Additionally, the invention includes an equally precise mechanism for accurately regulating the depth of cut of the buffing rasp after the precise radius adjustment of the carriage has been established, and these two features are coordinated in the invention in a unique manner to form a highly efficient buffing machine to meet the present-day needs of the industry.

The invention offers other notable improvements such as the ability of the machine to employ a standard type of "shelf" main drive motor for the rasp. This motor is floor-mounted with a belt drive leading to a long rasp shaft which is supported in widely spaced bearings on a sturdy pedestal for ruggedness and durability. Cuttings and dust are drawn off by a vacuum system and the rasp is enclosed by a safety shield which is automatically retracted when the tire casing drive is turned on. At this same time a tire diameter gaging means is drawn automatically into active contact with the tread face of the tire.

Another important feature of the invention resides in the provision of an auxiliary or kick cylinder under control of the machine operator to assure rapid inflation of the tire casing by forcing one tire mounting head or plate firmly into air sealing engagement with the adjacent bead of the casing at the start of inflation.

Finally, a conveniently located front console places all controls in ready reach of an operator standing at the front of the machine with a clear view of the entire operation. Bulky control valves and associated parts may be mounted remotely from the console proper for the sake of compactness.

Other unique features and advantages of the invention will become apparent during the course of the following detailed description.

DETAILED DESCRIPTION

Referring to the drawings in detail wherein like numerals designate like parts, the buffing machine comprises a base plate 20 adapted to be anchored firmly to a floor. Rigidly secured to the base plate at one side thereof is a sturdy pedestal 21 for the support of a horizontal drive shaft 22 carrying the tire buffing rasp 23 at its interior end, at an elevation considerably above the base plate 20. The rasp drive shaft is supported for rotation in widely spaced bearings 24 fixed to the pedestal 21. An electric drive motor 25 for the shaft 22 of a standard commerical type is conventionally mounted on the base plate 20 near one rearward corner thereof. The armature shaft of motor 25 is parallel to the shaft 22 and is drivingly connected therewith preferably by belt transmission means 26, as shown in the drawings, such transmission means being disposed at one side of the machine and preferably being enclosed by a cover or guard 27, FIG. 1. The shaft 22 and its bearings 24 are also preferably enclosed by a removable cover 28.

Immediately below the horizontal axis rasp 23, a suction hood 29 is suitably coupled to the back of pedestal 21 in registration with a mouth 30 formed through the pedestal so that dust and cuttings generated by the tire buffing operation may be withdrawn rearwardly from the machine through a conduit means 31 to a suitable disposal point.

On the other side of base plate 20, remote from motor 25 is a fore and aft horizontal guideway consisting of two spaced parallel guide bars 32 supported at their forward and rear ends by bearing plates 33, fixed with relation to the base plate 20. A carriage 34 for the tire casing support, drive and inflation assembly, yet to be described, is mounted slidably on the guide bars 32 for fore and aft movement horizontally just above the base plate 20. A screw shaft 35 for operating the carriage 34 along its guide means has rotary threaded engagement with the carriage as at 36, FIG. 7. The screw shaft 35 is driven from its rear end by a reversible electric motor 37 on the base plate 20, coupled with a speed reducer 38, in turn drivingly connected with the screw shaft preferably by chain gearing 39.

Figure 1:
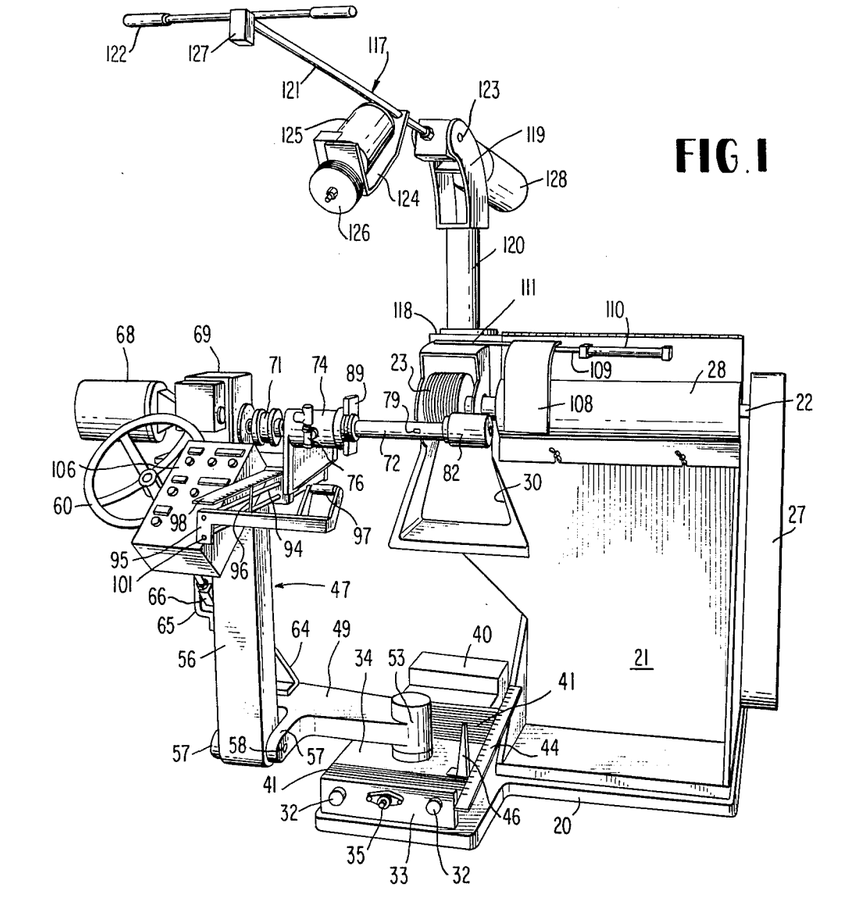
FIG. 1 is a front perspective view of a buffing machine embodying the invention.

These drive components are preferably enclosed by a readily removable housing means 40, shown only in FIG. 1. To protect the screw shaft 35 and associated components from cuttings and dust, the same are enclosed by a flexible bellows 41 whose fore and aft sections are sealed to the forward and rear ends of carriage 34. Safety limit switches 42 are mounted on the two plates 33 in the path of movement of lugs 43 on the carriage 34 to assure interruption of carriage drive motor 37 and stopping of the carriage before any damage could occur due to excessive fore or aft movement of the carriage.

Figure 3:
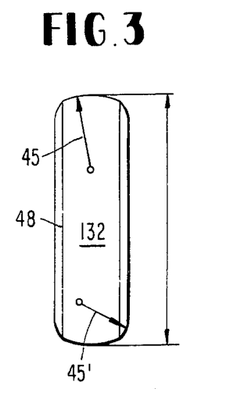
FIG. 3 is a diagrammatic elevational view of a tire casing illustrating radii which determine with precision the tread face profile of the tire being processed with the machine.

A visual measuring scale 44 whose scale graduations are representative of the rather critical crown radius 45, FIG. 3, is fixedly mounted at one side of the carriage guideway in ready view of the machine operator. A coacting pointer 46 on the carriage 34 travels along the scale or indicator 44 to provide the operator with a visual indication of the radius 45 at all times.

Figures 6, 7, 8:
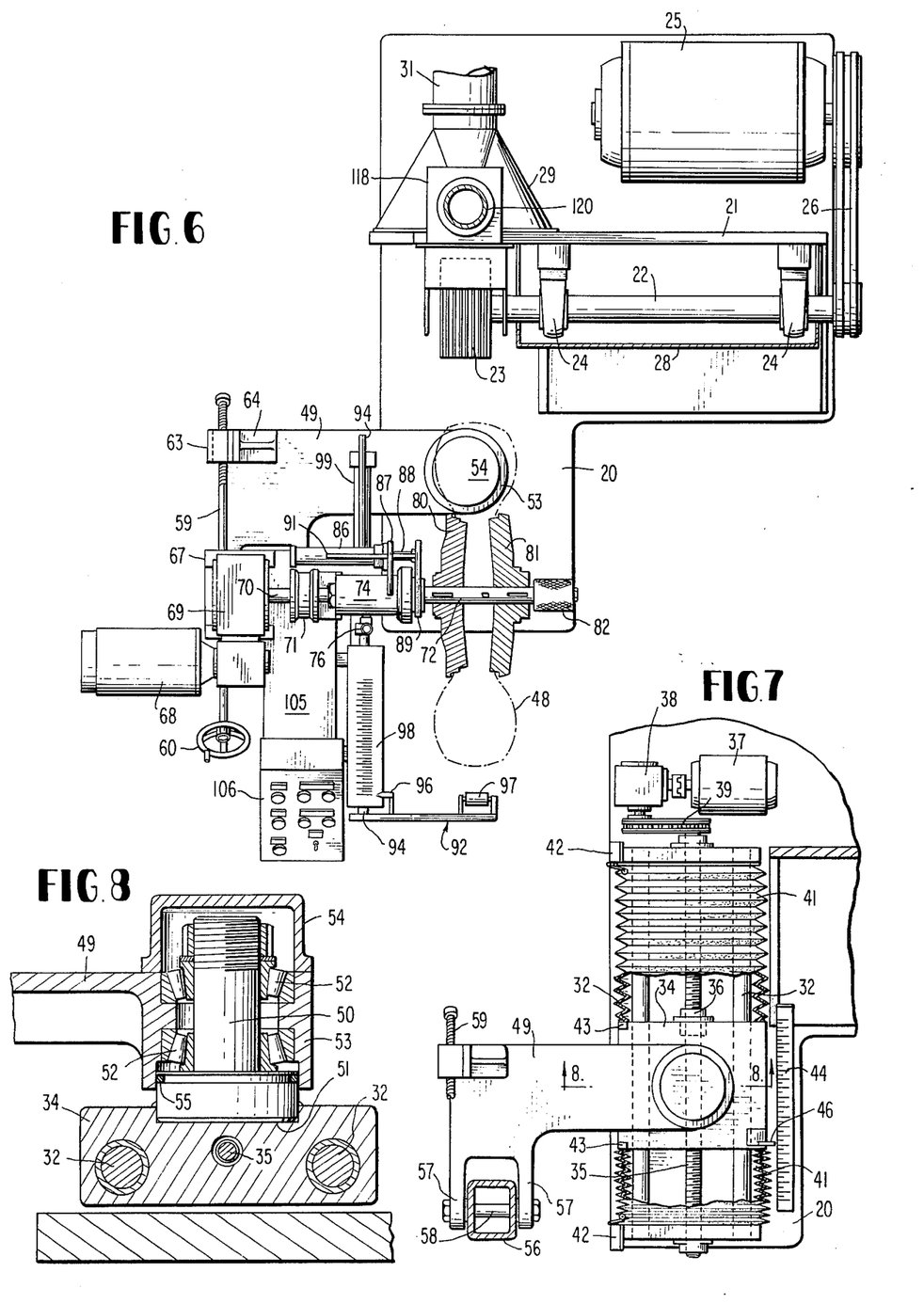
FIG. 6 is a plan view of the machine with parts in section and parts omitted.
FIG. 7 is a fragmentary horizontal section taken substantially on line 7—7 of FIG. 4 with parts omitted.
FIG. 8 is an enlarged fragmentary vertical section taken on line 8—8 of FIG. 7.

An assembly 47 for the mounting, turning and critical adjustment of a tire casing 48 being processed includes a horizontally swingable mounting arm 49 of heavy construction supported rotatably on a vertical pivot post 50, FIG. 8, rigidly secured within a recess 51 of carriage 34. Sturdy roller bearings 52 are intervened between the pivot post 50 and the hub 53 of horizontally swingable arm 49. A cap 54 covers the top of the post 50 and the lower end of hub 53 is sealed as at 55.

Figure 2:
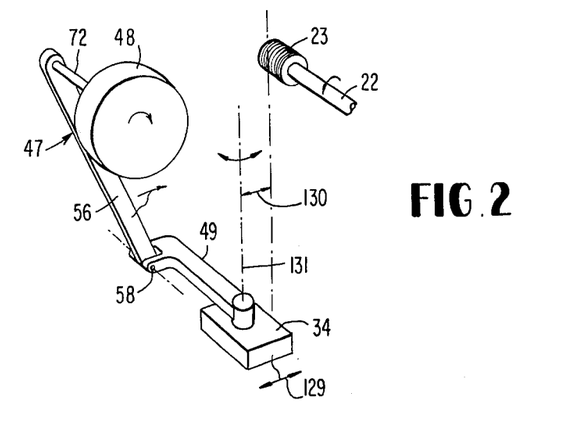
FIG. 2 is a diagrammatic perspective view of the tire casing mounting and driving means in relation to the buffing rasp and depicting the basic adjustments and movements which determine the radius of cut and the depth of cut.

A vertically swingable support arm 56 is pivoted to the horizontal arm 49 between spaced lugs 57 thereof by a pivot pin 58 which is at right angles to the pivot post 50 and also offset therefrom as shown in FIGS. 1 and 2. The arm 56 is moved forwardly and rearwardly in a vertical arc on the axis of pin 58 by an inclined screw shaft 59 having a hand wheel 60 at its top and forward end in ready reach of the operator standing at the front of the machine. The screw shaft 59 has threaded engagement with a nut 61 swiveled at 62 to a bracket 63, in turn mounted on a support bracket 64 firmly attached to the arm 49. Another bracket 65 attached to the side of arm 56 contains a swiveled block 66 within which the upper unthreaded portion of screw shaft 59 is rotatably mounted but held against axial movement relative to the block 66. The arrangement is such that turning of the screw shaft 59 on its axis will force the arm 56 to swing vertically in one direction or the other, toward or away from the rasp 23 about the axis of pin 58. The arm 56 is offset considerably from the rasp 23 as shown in the drawings.

The top of arm 56 has a sturdy mounting bracket 67 fixedly secured thereto and on this bracket is mounted an electric motor 68 and associated right angled drive and speed reducer 69, having an output shaft 70. This shaft 70, through a coupling 71, drives a tire inflation and support 72, journaled for rotation in ball bearings 73 contained within an inflation head 74 rigid with the bracket means 67. Compressed air enters an annular chamber 75 of inflation head 74 surrounding shaft 72 from a suitable fitting 76 on one side of the head 74. From the chamber 75, the inflation air enters through a port 77 in shaft 72 to the bore 78 thereof. From this bore, the inflation air exits through another radial port 79 to the interior of the tire casing 48 to inflate the same.

The casing 48 is supported by a pair of mounting heads or plates 80 and 81 keyed to the shaft 72 to turn therewith but being axially shiftable thereon, FIG. 6. The outermost plate 81 is restrained by a safety nut 82 of the construction disclosed and claimed in U.S. Pat. No. 3,584,662 to Mattox et al. The interior head of plate 80 is adapted to solidly engage a shoulder 83 of shaft 72 when the casing 48 is fully inflated. Both plates 80 and 81 have peripheral seats 84 to sealingly engage the beads of tire casing 48.

Figure 9:
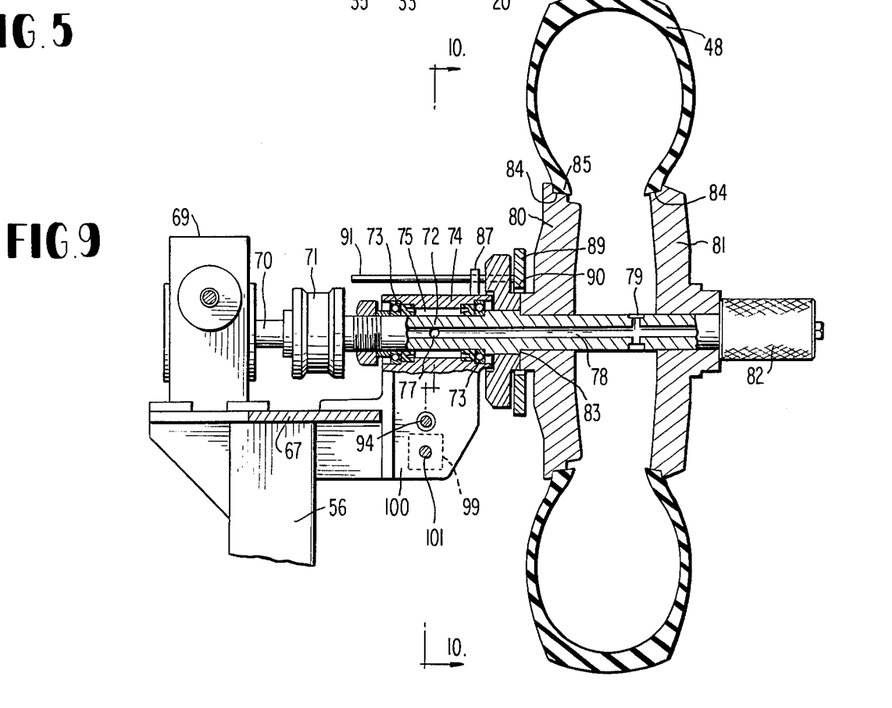
FIG. 9 is an enlarged fragmentary vertical section through an inflation and drive shaft and associated components.
Figure 10:
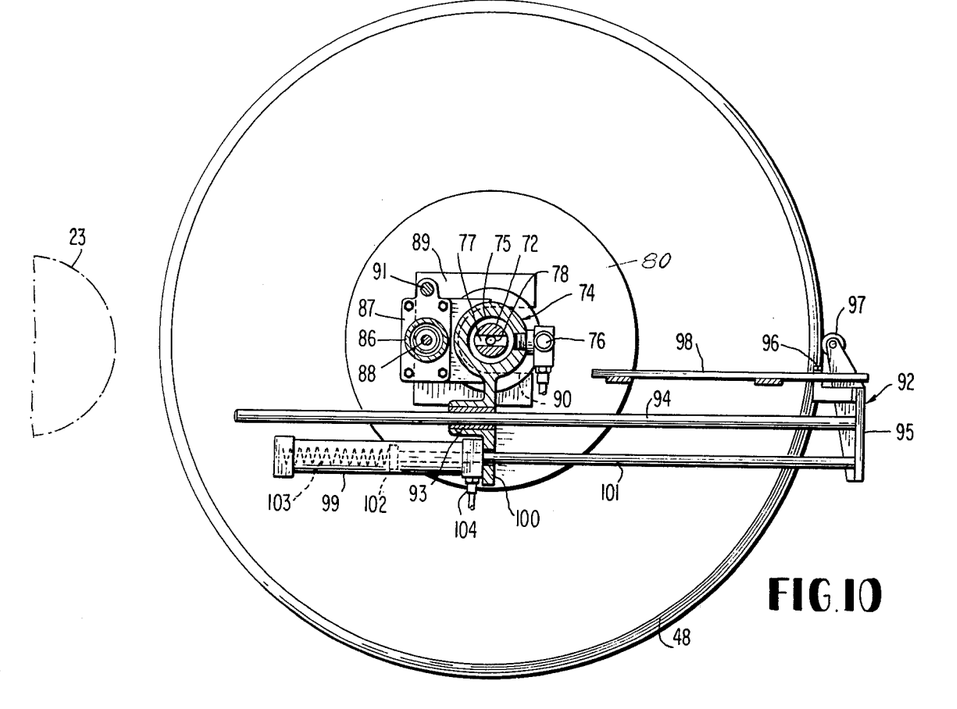
FIG. 10 is a vertical section taken on line 10—10 of FIG. 9.

A unique means is provided to assure that the interior plate 80 will form a seal with the adjacent bead 85 during the initial stage of inflation. For this purpose, a pneumatic kick cylinder 86 is mounted on one side of inflation head 74, FIG. 10, by a suitable mounting bracket 87. This kick cylinder has its rod 88 attached to a push plate 89 which is slotted at 90 for clearnace around the hub of casing mounting plate 80. The push plate 89 engages the mounting plate 80 when kick cylinder 86 is pressurized and forces the plate 80 into firm sealing engagement with bead 85 of casing 48 so that inflation of the casing may take place quickly without excessive leakage. When the casing becomes fully inflated, which is the condition shown in FIG. 9, plate 81 will abut safety nut 82 and the plate 80 will abut shoulder 83. The inflation force on the plate 80 is sufficient to overcome pressure in the kick cylinder 86, and the rod 88 of the kick cylinder will simply yield against inflation pressure and retract with the push plate 89. The push plate 89 is additionally guided and held against turning by a rod 91 slidably engaging through an opening in the bracket means 87 as best shown in FIG. 10. All of the described structure shown particularly in FIG. 9 is of course bodily supported on the vertically swingable arm 56.

Also provided on the machine is a convenient gaging means 92 to allow the operator to constantly monitor the buffed diameter of casing 48 so as not to remove an excessive amount of rubber and thus destroy the casing. This gaging means comprises a horizontal slide bearing 93, FIG. 10, attached to the bottom of inflation head 74 at right angles to the axis thereof. A gage support rod 94 engages slidably through the bearing 93 and carried at its forward end a head 95 serving to mount a gage pointer 96 and a follower roller 97 which contacts and follows the tread face of the tire casing so as to constantly monitor the diameter thereof. A stationary level diameter measuring scale 98 is mounted near one side of the arm 56 near the top thereof and suitably attached thereto. The pointer 96 is adapted to follow and coact with the graduated face of scale 98 which is calibrated to represent the diameter of the tire casing 48 in terms of the material buffed thereform.

The gaging means is moved into active contact with the tire casing by a pneumatic cylinder 99 secured to a bracket extension 100 of inflation head 74. The rod 101 of cylinder 99 is also connected with head 95 for shifting the same together with the guided rod 94. The piston 102 in cylinder 99 is biased forwardly by a spring 103, whereby the diameter gage will be held normally in an inactive position, until compressed air is introduced at 104 into the forward end of the cylinder 99 to cause rearward movement of piston 102 therein against the spring 103.

Figures 11, 12:
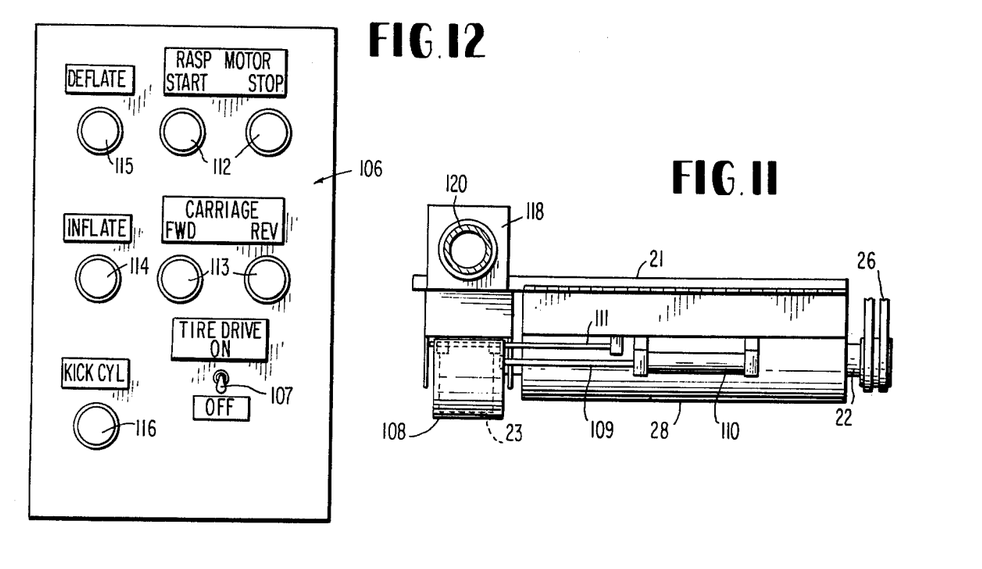
FIG. 11 is a fragmentary plan view showing housing and guard components for the rasp drive shaft and rasp.
FIG. 12 is a plan view of a console.

Also mounted to move with the arm 56 and attached to an extension 105 of bracket means 67 is an operator's control console 106, whose top inclined face contains the essential controls of the machine, in ready reach of an operator standing at the front of the machine. The electropneumatic machine controls are entirely conventional and per se form no part of the invention and therefore need not be diagramed and described in detail. It is sufficient to explain that the control console 106 has a tire drive on and off switch 107 which performs three functions simultaneously when turned on by the operator. It activates the motor 68 which drives the shaft 72 on which the tire casing 48 is mounted; it pressurizes cylinder 99 to move gaging roller 97 into contact with the tire casing tread face; and it automatically moves a safety guard 108 horizontally to uncover rasp 23. In this latter connection, the guard 108 is moved by the rod 109 of a small pneumatic cylinder 110, the guard being guided in its movement by another guide rod 111, see FIG. 11. The switch 107, when turned on, activates a remote solenoid-operated valve or the like, not shown, which in turn causes piston rod 109 to retract in a conventional manner.

The control console 106 further carries start and stop push buttons 112 for rasp drive motor 25 and forward and reverse push buttons 113 for carriage drive motor 37, all independently controllable by the operator. Inflate and deflate push buttons 114 and 115 control the admission and exhausting of inflation air through the inflation shaft 72 from a remote solenoid-operated valve, not shown, forming a part of the conventional controls. The console 106 additionally carries another push button 116 for the independent control of kick cylinder 86, allowing the operator to exercise full control over the inflation procedure.

Figure 4:
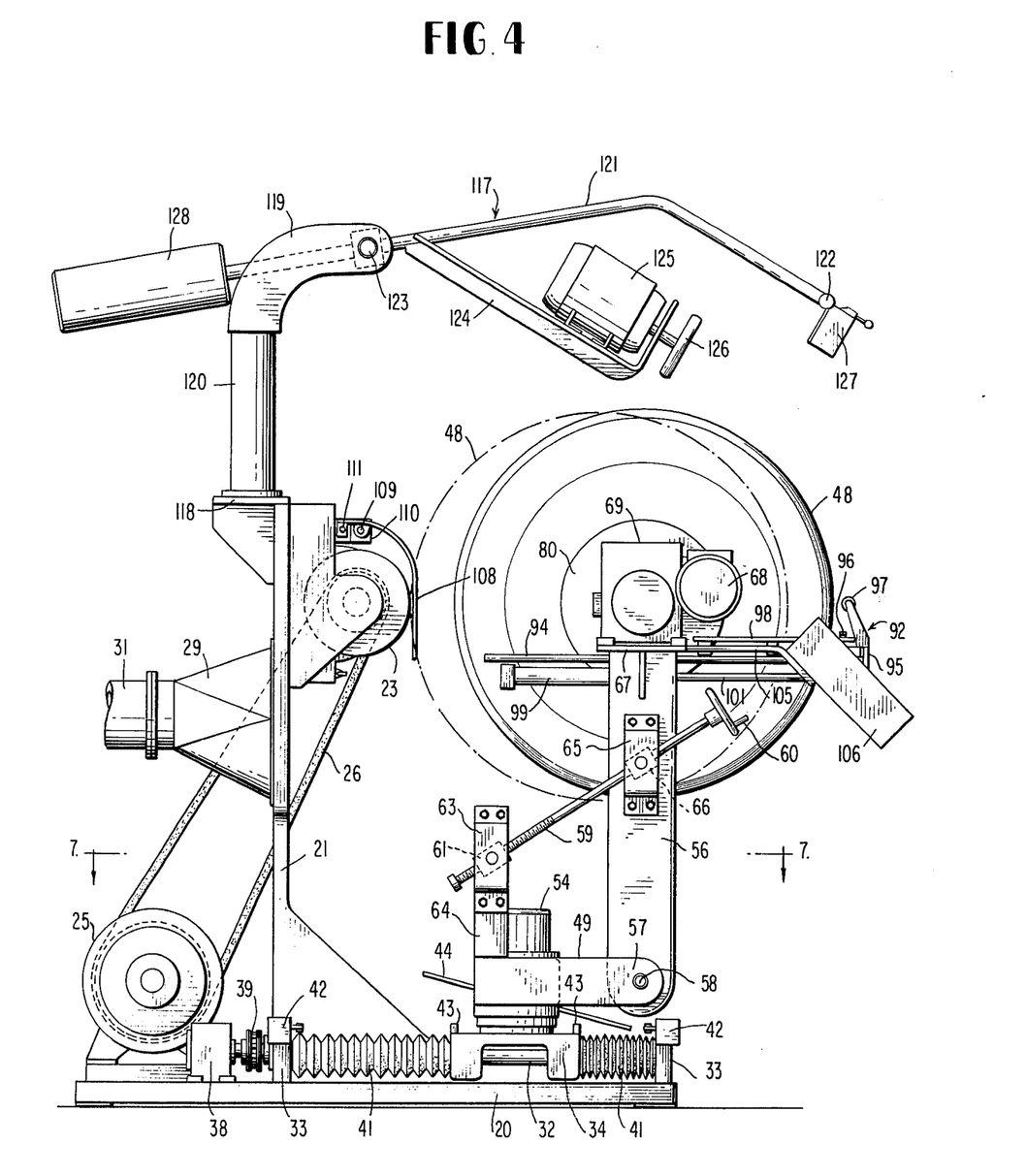
FIG. 4 is a side elevation of the machine.
Figure 5:
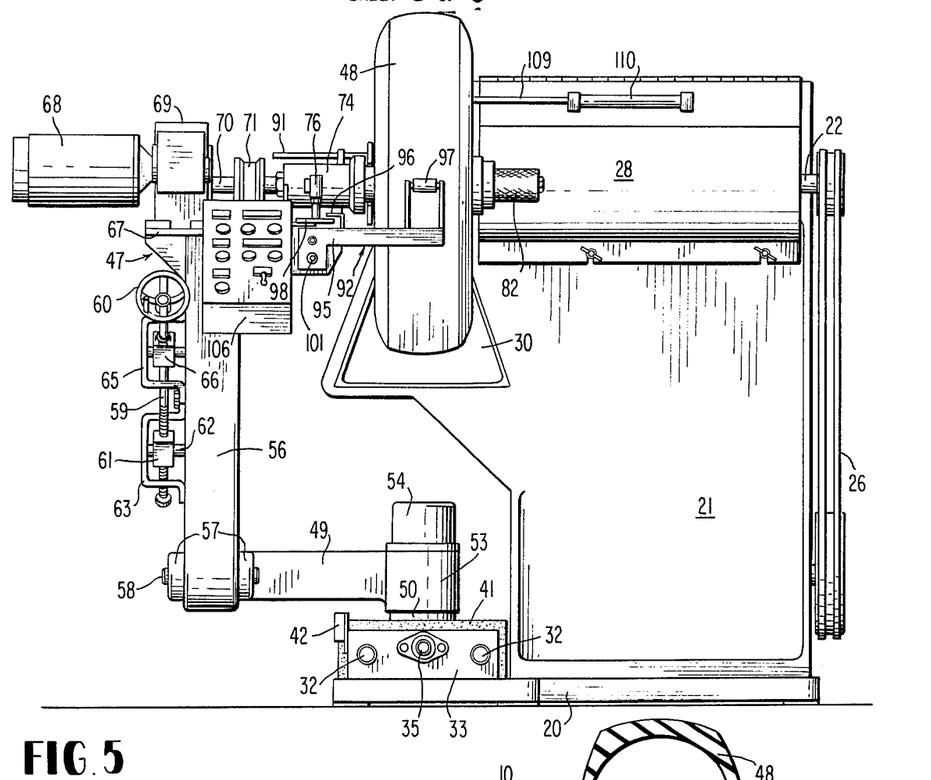
FIG. 5 is a front elevation thereof.

An overhead counterbalanced side wall buffing unit 117 is provided on the machine to allow side wall and shoulder finishing operations under direct control of the operator. The unit 117 is supported on a bracket 118 secured to the top of pedestal 112. An elbow support 119 for the unit 117 is swingable in a horizontal plane a full 360° around the vertical axis of a support post 120 which rises from bracket 118. The unit 117 further consists of an operator's arm 121 having a forward handle 122 and being pivoted at 123 to the elbow 119 for free swinging in a vertical plane. A depending support arm 124 for a side wall buffer drive motor 125 depends rigidly from the operator's arm 121 at an inclined angle as shown in FIG. 4. A rotary side wall buffing tool 126, or disc, is driven by the motor 125 under control of the operator who utilizes an off-on switch 127 for the motor 125 situated on the handle 122. The arrangement allows the operator to move the buffing element 126 conveniently into contact with side wall portions of the tire casing 48. The unit 117 has a counterbalancing weight 128 on the end of the arm 121 remote from the motor 125.

SUMMARY OF OPERATION

With the tire casing 48 mounted on the heads or plates 80 and 81, and safety nut 82 securely in place on shaft 72, the operator may now inflate the tire casing. To do this, he merely depresses inflation push buttom 114 and a remotely controlled valve means, not shown, delivers compressed air through fitting 76 to chamber 75, port 77, bore 78 and port 79 into the tire casing. At substantially the same time, the operator may utilize kick cylinder push button 116 to the extent required to cause push plate 89 to engage head 80 and force it into sealing engagement with tire bead 85 so that air will not escape from the casing. Push plate 89 is activated by cylinder means 86, as previously described. When the casing 48 is properly inflated, the inflation pressure will force heads 80 and 81 into contact with shoulder 83 and safety nut 82, respectively, and the inflation pressure will overcome the pressure of cylinder 86 and force the piston in this cylinder to yield or retract.

With the tire inflated, the rasp 23 may be activated by depressing start button 112 and the switch 107 is turned on to start up tire casing drive motor 68 which, through gearing 69 and coupling 71, imparts rotation to shaft 72, heads 80 and 81, and the tire casing. Simultaneously, the turning on of switch 107 activates the diameter gaging means 92 by causing retraction of piston rod 101 and also simultaneously the rasp guard 108 is shifted to open position by pneumatic cylinder means 110. The machine is now conditioned to form the actual fubbing procedure.

To establish the desired radii 45 and 45', FIG. 3, the radius control carriage 34 is driven in the necessary direction relative to rasp 23 by the use of the carriage forward or reverse push buttom 113. Referring to FIG. 2, this linear movement of the carriage 34 indicated at 129 increases or decreases the distance 130 between the vertical pivot 131 of the assembly 47 and the rasp 23. Therefore, for a given adjustment of the carriage 34, a definite and fixed radius 45 will be established, thereby establishing a definite and fixed crown or arc across the tread face 132 of the tire casing.

With this radium adjustment properly made, the operator now remains hand wheel 60 and screw shaft 59 to swing arm 56 on its pivot 58 so as to feed the tire casing into the turning rasp or buffer 23. This feeding adjustment regulated by the screw shaft 59 is precise and determines the depth of cut by the buffer or rasp 23, allowing removal of the worn tread without removing too much or too little rubber from the casing. The depth of cut in terms of tire diameter may constantly be observed on the scale 98, the position of pointer 96 being established by the roller element 97 which remaining in contact with the tire casing tread face. Also it should be mentioned that the visual indicating scale 44 allows the operator to observe at all times the radius established by the adjustment of carriage 34.

After making the foregoing adjustments, it remains only for the operator to swing the entire assembly 47 on the vertical pivot 131 formed by the post 50 in FIG. 8. This sweeps the tire tread face back and forth across the rasp 23 on the precise radius 45 previously established by adjusting the carriage 34, thereby forming an accurate predetermined crown or arc across the tread surface. The procedure of swinging the arm 56 toward the rasp by means of screw shaft 59 and swinging the assembly 47 on the vertical pivot formed by post 50 is repeated until sufficient rubber has been removed from the tread face. Finishing operations on the casing side walls are performed by use of the overhead universally mounted unit 117, whose operation should be clear to anyone skilled in this art.

After completion of the buffing operation, the carriage 34 may be adjusted away from the rasp and the rasp may be deactivated by stop button 112 and the tire drive motor 68 deactivated by turning off switch 107. This also allows spring 103 to force gage unit 92 forwardly and out of contact with the tire casing and simultaneously moves guard 108 in front of rasp 23. Following this, the deflation push button 115 is depressed by the operator to bleed air from the tire casing through the hollow shaft 72 and the casing is ready to be removed from the machine.

In connection with the secondary radius 45' shown in FIG. 3, a further adjustment of carriage 34 along its ways 32 may be effected, and with the assembly 47 already turned to one side on the vertical pivot, the shoulders of the casing 48 may be buffed or formed on the radius 45'. The machine is therefore quite versatile and is capable of processing a full range of tire sizes. It is characterized above all by precision in the buffing operation and uniformity as to results obtained in comparison to the less precise and efficient machines of the prior art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A machine for buffing tire casings comprising a horizontal axis rotary rasp and power means connected with the rasp to turn it, a carriage mounted for linear movement toward and away from the rasp at an elevation below the axis of the rasp, precision power-operated screw shaft means connected with the carriage to move it horizontally in a linear path forwardly and rearwardly relative to the rasp, a vertical axis pivot element on said carriage disposed substantially in a vertical plane through the transverse center of the carriage and through the center of the rasp, a horizontally swingable support arm journaled on said vertical axis pivot element, a horizontal axis pivot element on said horizontally swingable support arm, a vertically swingable support arm extending above the horizontally swingable arm and pivotally connected with said horizontal axis pivot element, a precision screw shaft feed means coupled to the vertically swingable support arm to swing the same in a vertical plane toward and away from said rasp, the vertically swingable arm being laterally offset from said rasp, a horizontal tire casing drive and inflation shaft journaled for rotation on the upper end of the vertically swingable support arm at substantially the elevation of said rasp, power drive means for said drive and inflation shaft on the vertically swingable support arm, and a control console for the machine on the vertically swingable support arm including independent controls for the rasp power means, carriage screw shaft means and said power drive means for said drive and inflation shaft.

2. A machine for buffing tire casings as defined by claim 1, and an upright pedestal for supporting said rasp at an elevation above a floor, an elongated horizontal rotary shaft carrying said rasp, widely spaced bearings for the support of said shaft secured to said pedestal, a floor-mounted electric motor for driving said shaft on one side of the pedestal, and driving connecting means between said motor and said shaft.

3. A machine for buffing tire casings as defined by claim 1, and fixed floor-mounted horizontal guideway means for said carriage extending at right angles to the rotational axis of the rasp, said power-operated screw shaft means comprising a horizontal rotary screw shaft having threaded engagement with the carriage, and floor-mounted motor and gearing means connected with the screw shaft to turn the same on its axis.

4. A machine for buffing tire casings as defined by claim 3, and a visual linear measurement scale positioned near one side of the carriage and a coacting pointer attached to the carriage and movable therewith along said scale.

5. A machine for buffing tire casings as defined by claim 3, and a flexible enclosure for said horizontal guideway means and attached to opposite ends of the carriage and guideway means.

6. A machine for buffing tire casings as defined by claim 1, and a kick cylinder and push plate unit mounted on the vertically swingable support arm near side drive and inflation shaft, a pair of tire casing mounting heads mounted on said drive and inflation shaft to turn therewith and being axially movable thereon, said push plate adapted to engage one of said mounting heads during inflation of a tire casing and forcing such head into air sealing engagement with a bead of the casing, inflation of the tire casing causing said heads to separate axially of the drive and inflation shaft and to contact fixed shoulder means on the shaft, said kick cylinder and push plate unit then yielding to the inflation pressure causing the axial separation of said heads.

7. A machine for buffing tire casings as defined by claim 6, and an independent control element on said console for said kick cylinder and push plate unit.

8. A machine for buffing tire casings as defined by claim 1, and an inflation head carried by said vertically swingable support arm and forming a bearing support for said drive and inflation shaft and having an inflation air receiving chamber surrounding said shaft, said shaft having a bore and a port leading from said bore and opening into said chamber, said shaft having a second port delivering inflation air to a tire casing on said shaft.

9. A machine for buffing tire casings as defined by claim 1, and a tire casing diameter gaging unit carried by said vertically swingable support arm including an element adapted to contact the tread surface of a tire casing on said drive and infaltion shaft, resilient means biasing said gaging unit away from engagement with the tire casing, and cylinder-piston means connected with the gaging unit to draw the same into engagement with the tire casing when said power drive means for the drive and inflation shaft is activated.

10. A machine for buffing tire casings as defined by claim 9, and said gaging unit comprising a linear indicating scale representative of tire casing diameter mounted adjacent said control console and a pointer movable along the indicating scale and connected with said cylinder-piston means.

11. A machine for buffing tire casings as defined by claim 10, and said gaging unit additionally comprising a support and guide bar for the unit, a bearing sleeve slidably supporting said guide bar, and head element attached to the guide bar and to the piston rod of said cylinder-piston means and carrying said element adapted to contact said tread surface.

12. A machine for buffing tire casings as defined by claim 1, and an overhead universally supported side wall buffing assembly on the top of a fixed part of the machine.

13. A machine for buffing tire casings as defined by claim 12, and said fixed part of the machine comprising an upstanding pedestal upon which said horizontal axis rasp is supported, said side wall buffing assembly including a counterbalanced vertically swingable arm, a side wall buffer drive motor carried by said arm, and a control switch for said motor on the leading end portion of said arm in ready reach of an operator standing at the front of said machine.

14. A machine for buffing tire casings as defined by claim 1, and a vacuum dust and particle disposal conduit means having an inlet mouth arranged adjacent to said rasp and extending rearwardly thereof relative to the front of the machine.

15. A machine for buffing tire casings as defined by claim 1, and a retractable guard for the forward side of said rasp, and power means connected with said guard and shifting it to a rasp exposing position when said powder drive means for said drive and inflation shaft is activated.

16. A machine for buffing pneumatic tire casings comprising a pedestal, a horizontal axis rotary rasp mounted on said pedestal near the top thereof, a floor-mounted electric motor mounted near the pedestal, transmission means operatively connecting the armature shaft of said motor to said rotary rasp, a horizontal carriage guidway mounted below said rasp and extending forwardly thereof, a carriage engaging said guideway for linear movement toward and away from said rasp, power means connected with the carriage to move it in opposite directions on said guideway, a horizontally swingable support arm pivotally mounted on said carriage, an upstanding vertically swingable support arm pivotally mounted on the horizontally swingable support arm, manually operable power means connected with the vertically swingable support arm to move the same on its pivot toward and away from said rasp, a rotary tire casing drive and inflation shaft journaled for rotation on said vertically swingable support arm and having inflation air passage means, power drive means for said shaft on said vertically swingable support arm, and a pair of tire casing mounting heads on said shaft having elements engageable with tire casing beads in air retaining relationship.

17. A machine as defined by claim 16, and an operator's control console on said vertically swingable support arm.

18. A machine as defined by claim 16, and an overhead counterbalanced universally swiveled power driven tire casing side wall buffing assembly including an operating handle mounted on the top of said pedestal.

* * * * *